(12) United States Patent
Walck et al.

(10) Patent No.: US 6,979,499 B2
(45) Date of Patent: Dec. 27, 2005

(54) IMAGE DISPLAY SYSTEM UTILIZING LIGHT EMITTING MATERIAL

(75) Inventors: Scott D. Walck, Allison Park, PA (US); Albert Monroe Snider, Jr., Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/642,723

(22) Filed: Aug. 18, 2003

(65) Prior Publication Data

US 2004/0070551 A1    Apr. 15, 2004

Related U.S. Application Data

(63) Continuation-in-part of application No. 10/047,296, filed on Jan. 14, 2002, now abandoned.

(60) Provisional application No. 60/262,146, filed on Jan. 16, 2001.

(51) Int. Cl.[7] .......................... B32B 9/00; B32B 17/06; G02B 27/00
(52) U.S. Cl. ...................... 428/690; 428/410; 428/426; 428/913; 250/484.4; 345/7; 359/359; 40/542; 40/543
(58) Field of Search .................... 428/34, 203, 204, 428/206, 207, 410, 426, 441, 690, 913, 917; 250/484.4, 485.1, 486.1; 252/301.16, 301.34, 252/301.35, 301.36, 301.6 S; 257/98; 313/112; 40/542, 543

(56) References Cited

U.S. PATENT DOCUMENTS

| | | | |
|---|---|---|---|
| 2,264,044 A | 11/1941 | Lee | ............................. 116/57 |
| 2,878,606 A * | 3/1959 | Meijer | .......................... 40/543 |
| 3,723,805 A | 3/1973 | Scarpino et al. | |
| 3,762,988 A | 10/1973 | Clock et al. | ................. 161/183 |
| 4,081,716 A | 3/1978 | Uemura | |
| 4,287,107 A | 9/1981 | Hermann et al. | ....... 260/28.5 R |
| 4,466,562 A | 8/1984 | DeTorre | ......................... 225/2 |
| 4,504,109 A | 3/1985 | Taga et al. | .................... 350/1.6 |
| 4,575,722 A | 3/1986 | Anderson | |
| 4,610,771 A | 9/1986 | Gillery | ..................... 204/192.1 |
| 4,671,155 A | 6/1987 | Goldinger | ..................... 83/886 |

(Continued)

FOREIGN PATENT DOCUMENTS

DE          40 29 312          3/1992

(Continued)

OTHER PUBLICATIONS

U.S. Appl. No. 60/262,146 filed Jan. 16, 2001.

(Continued)

*Primary Examiner*—Marie Yamnitzky
(74) *Attorney, Agent, or Firm*—Andrew C. Siminerio

(57) ABSTRACT

A display system includes at least one light emitting material having an absorption band carried on a support, wherein the support is a laminated article having a first ply and a second ply; and a projection assembly having an electromagnetic radiation source, the projection assembly configured to direct radiation of one or more selected wavelengths within the absorption band of the light emitting material toward the light emitting material to cause at least a portion of the light emitting material to emit light. The support can be an automotive transparency, a commercial window, a residential window, a commercial sign, an advertising display, and an insulating glass unit. The light emitting material is fluorescent materials, phosphorescent materials, and mixtures thereof.

29 Claims, 3 Drawing Sheets

U.S. PATENT DOCUMENTS

| | | | |
|---|---|---|---|
| 4,716,086 A | 12/1987 | Gillery et al. | 428/630 |
| 4,746,347 A | 5/1988 | Sensi | 65/94 |
| 4,757,232 A | 7/1988 | Berkstresser et al. | 313/468 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,898,789 A | 2/1990 | Finley | 428/623 |
| 4,898,790 A | 2/1990 | Finley | 428/623 |
| 4,902,580 A | 2/1990 | Gillery | 428/623 |
| 4,935,722 A * | 6/1990 | Pollack | 340/479 |
| 4,948,677 A | 8/1990 | Gillery | 428/623 |
| 4,952,423 A | 8/1990 | Hirata et al. | 427/109 |
| 5,013,134 A | 5/1991 | Smith | 350/174 |
| 5,028,579 A | 7/1991 | Inui et al. | 503/201 |
| 5,028,759 A | 7/1991 | Finley | 219/203 |
| 5,059,295 A | 10/1991 | Finley | 204/192.27 |
| 5,066,525 A | 11/1991 | Nakamachi et al. | 428/29 |
| 5,240,886 A | 8/1993 | Gulotta et al. | 501/70 |
| 5,385,872 A | 1/1995 | Gulotta et al. | 501/70 |
| 5,393,593 A | 2/1995 | Gulotta et al. | 428/220 |
| 5,473,396 A | 12/1995 | Okajima et al. | 353/122 |
| 5,653,903 A | 8/1997 | Pinchok, Jr. et al. | 219/203 |
| 5,796,055 A | 8/1998 | Benson, Jr. et al. | 181/208 |
| 5,821,001 A | 10/1998 | Arbab et al. | 428/623 |
| 6,229,503 B1 | 5/2001 | Mays, Jr. et al. | 345/7 |
| 6,249,372 B1 | 6/2001 | Kobayashi et al. | 359/326 |
| 6,303,238 B1 | 10/2001 | Thompson et al. | 428/690 |
| 6,304,365 B1 | 10/2001 | Whitehead | 359/296 |
| 6,490,402 B1 | 12/2002 | Ota | 385/147 |
| 2002/0075210 A1 | 6/2002 | Nestorovic et al. | 345/87 |
| 2002/0120916 A1 | 8/2002 | Snider, Jr. | 717/100 |

FOREIGN PATENT DOCUMENTS

| | | |
|---|---|---|
| EP | 0 422 583 | 4/1991 |
| EP | 0 795 847 | 9/1997 |
| WO | 89/03059 | 4/1989 |
| WO | WO 91/06031 | 5/1991 |
| WO | 95/34014 | 12/1995 |
| WO | 02/058402 | 7/2002 |

OTHER PUBLICATIONS

U.S. Appl. No. 10/047,296 filed Jan. 14, 2002.

Chen et al., "Guided-Wave Electro-Optic Beam Deflector Using Domain Reversal in $LiTaO_3$", Journal of Lightwave Technology, vol. 12, No. 8, Aug. 1994, pp 1401-1404.

Scrymgeour et al., "Cascaded electro-optic scanning of laser light over large angles using domain microengineered ferroelectrics", Applied Physics Letters, vol. 81, No. 17, Oct. 21, 2002, pp. 3140-3142.

Pollack et al., "Upconversion use for viewing and recording infrared images", Applied Optics, vol. 26, No. 20, Oct. 15, 1987, pp. 4400-4406.

Downing et al., "A Three-Color, Solid-State, Three-Dimensional Display", Science, vol. 273, Aug. 30, 1996, pp. 1185-1189.

Yokoyama et al., "Laser emission from high-gain media of dye-doped dendrimer", Applied Physics Letters, vol. 80, No. 1, Jan. 7, 2002, pp. 7-9.

D. Corbin et al., "Grating Light Valve and Vehicle Displays" (5 pages), publication date and source not provided.

* cited by examiner

IMAGE DISPLAY SYSTEM UTILIZING LIGHT EMITTING MATERIAL

This application is a continuation-in-part application of U.S. application Ser. No. 10/047,296 filed on Jan. 14, 2002, in the name of Albert Monroe Snider, Jr. for "HEAD-UP DISPLAY SYSTEM UTILIZING FLUORESCENT MATERIAL" which in its entirety is herein incorporated by reference. This application claims the benefits of U.S. application Ser. No. 60/262,146 filed Jan. 16, 2001, which in its entirety is herein incorporated by reference.

BACKGROUND OF THE INVENTION

1. Field of the Invention

This invention relates generally to image and/or information display systems and, in one non-limiting embodiment, to an improved display system utilizing light emitting, e.g. fluorescent material(s), which is particularly useful in a vehicle head-up, display system.

2. Technical Considerations

An information display system displays an image, e.g. but not limited to black and white, and/or colored stationary objects, moving objects, alphanumerical characters, to convey information to a viewer. One such information display system is a head-up display (HUD) system. The heads-up display system displays information, such as an image, to a viewer while the viewer simultaneously views the real world around and through the displayed image. Head-up display systems are often incorporated into aircraft cockpits and/or transparencies for pilots to monitor flight information. More recently, head-up display systems have been used in land vehicles, such as cars, trucks, and the like. The displayed image is generally positioned so that the vehicle operator can see the image from a normal operating position and does not have to glance downwardly to the vehicle dashboard and away from the viewing area in front of the vehicle.

A conventional head-up display system typically includes a matrix of light emitting diodes (LED), which can be selectively illuminated to form an image. A collimator aligns the light rays from the LEDs and directs them toward a combiner that reflects the image toward the viewer. For automotive use, laminated windshields have been used as the combiner. Examples of automotive head-up display systems are disclosed, for example, in U.S. Pat. Nos. 2,264,044 and 5,013,134, and International Publication No. WO 91/06031, all of which are herein incorporated by reference.

While these known vehicle head-up display systems are generally adequate for automotive use, improvements could be made. For example, in these conventional automotive head-up display systems the resolution of the reflected image is limited by the size of the LED matrix, i.e., the number of rows and columns of LEDs used to generate the image. Additionally, in strong sunlight, the reflected image from the LED matrix can be difficult to read. Further, reflection of the image from each of the interfaces of the windshield, especially the air-glass interfaces, creates multiple images that can reduce overall image clarity. Moreover, these conventional head-up display systems are designed so that only the vehicle operator, not vehicle passengers, can view the reflected image. Additionally, if the curvature of the windshield deviates from designed specifications, the reflected image can appear distorted and can be difficult to discern.

Therefore, it would be advantageous to provide an information display system, particularly an automotive head-up display system, which reduces or eliminates at least some of the drawbacks discussed above.

SUMMARY OF THE INVENTION

The present invention provides display system, comprising: at least one light emitting material having an absorption band carried on a support, wherein the support is a laminated article having a first ply and a second ply; and a projection assembly having an electromagnetic radiation source, the projection assembly configured to direct radiation of one or more selected wavelengths within the absorption band of the light emitting material toward the light emitting material to cause at least a portion of the light emitting material to emit light. In one nonlimiting embodiment of the invention, the support is an automotive transparency, a commercial window, a residential window, a commercial sign, an advertising display, and an insulating glass unit. In another nonlimiting embodiment of the invention, the light emitting material is selected from fluorescent materials, phosphorescent materials, and mixtures thereof.

The present invention also provides a display system, comprising: at least one light emitting material having an absorption band carried on a automotive transparency; and a projection assembly having an electromagnetic radiation source, the projection assembly configured to direct radiation of one or more selected wavelengths within the absorption band of the light emitting material toward the light emitting material to cause at least a portion of the light emitting material to emit light.

Another nonlimiting embodiment of the present invention provides a head-up display system, comprising: at least one light emitting material having an absorption band carried on a support; and a projection assembly having an electromagnetic radiation source, the projection assembly configured to direct radiation of one or more selected wavelengths within the absorption band of the light emitting material toward the light emitting material to cause at least a portion of the light emitting material to emit light.

The present invention also provides a vehicle head-up display, comprising: a windshield having a first ply and a second ply; at least one light emitting material having an adsorption band and located between the first and second ply; and a projection assembly having an electromagnetic radiation source and configured to direct radiation of one or more selected wavelengths within the absorption band toward the light emitting material to cause at least a portion of the light emitting material to emit light to form an image.

The present invention further provides a method of displaying images, comprising the steps of: providing a support having at least one light emitting material; directing electromagnetic radiation from a radiation source in a first direction along a first scan path while selectively energizing and deenergizing the radiation source; displacing the electromagnetic radiation in a second direction substantially perpendicular to the first direction; and directing the electromagnetic radiation in a third direction along a second scan path substantially parallel to the first direction while selectively energizing and deenergizing the radiation source, wherein energizing and de-energizing the radiation source along the scan paths forms an image.

The present invention also provides a method of displaying images, comprising the steps of: selectively directing electromagnetic radiation from a radiation source towards an automotive transparency having at least one light emitting material; and moving the radiation along at least a portion of the automotive transparency and controlling the radiation source to cause the light emitting material to emit light to form an image.

The present invention further provides a display system, comprising: a sheet having at least one light emitting material having a predetermined absorption band and having a major surface defined as a first major surface and a major surface opposite to and spaced from the first major surface defined as a second major surface; a layer substantially non-transparent to wavelengths within the predetermined absorption band over a portion of the second major surface; and a projection assembly having an electromagnetic radiation source for generating at least one beam having at least one selective wavelength within the absorption band, the projection assembly including a movement device configured to direct the beam toward the first major surface to impinge the beam on the light emitting material and to move the beam over the surface of the light emitting material to cause at least a portion of the light emitting material to emit wavelengths at least in the range of 380 nanometers to 760 nanometers of the electromagnetic spectrum defined as the visible region.

The present invention also provides a laminated article for use in displaying images, comprising: a first transparent sheet having a first major surface and an opposite major surface defined as a second major surface; a second sheet having a first major surface and an opposite major surface defined as a second major surface; an interlayer between and securing the second surface of the first and second sheets to position the first and second sheets in facing relationship to one another, and at least one light emitting material having an absorption band on the first major surface of the first sheet or between the second major surfaces of the first and second sheets wherein the at least one light emitting material emits wavelengths in the range of 380 to 760 nanometers ("nm") of the electromagnetic spectrum when radiation of one or more selected wavelengths within the absorption band of the light emitting material impinges on the at least one light emitting material.

The present invention further provides a laminated article for use in displaying objects, comprising: a first transparent sheet having a first major surface and an opposite major surface defined as a second major surface; a second sheet having a first major surface and an opposite major surface defined as a second major surface; an interlayer between and securing the second surface of the first and second sheets in facing relationship to one another, and at least one light emitting material capable of Up-Conversion of infrared energy into visible radiation defined as Up-Conversion material on the first major surface of the first sheet or between the first major surfaces of the first and second sheets.

The present invention provides a head-up display, comprising: (a) a laminated transparency, comprising: a first transparent sheet having a first major surface and an opposite major surface defined as a second major surface; a second transparent sheet having a first major surface and an opposite major surface defined as a second major surface; an interlayer between and securing the first and second sheets to one another with the second major surfaces of the sheets facing one another, and at least one light emitting material having an absorption band on the first major surface of the first sheet or between the first major surfaces of the first and second sheets, and (b) a projection assembly having an electromagnetic radiation source, the projection assembly mounted in spaced relationship to the laminated transparency and configured to direct radiation of one or more selected wavelengths within the absorption band of the at least one light emitting material toward the first surface of the first sheet to impinge on the at least one light emitting material to cause selected portions of the at least one light emitting material to emit light.

The present invention also provides a head-up display, comprising: (a) a laminated transparency, comprising: a first transparent sheet having a first major surface and an opposite major surface defined as a second major surface; a second transparent sheet having a first major surface and an opposite major surface defined as a second major surface; an interlayer between and securing the first and second sheets to one another with the second major surfaces of the sheets facing one another, and at least one light emitting material capable of Up-Conversion of infrared energy into visible radiation defined as Up-Conversion material on the first major surface of the first sheet or between the first major surfaces of the first and second sheets, and (b) a projection assembly having an electromagnetic radiation source, the projection assembly mounted in spaced relationship to the laminated transparency and configured to direct radiation of one or more selected wavelengths within the absorption band of the at least one Up-Conversion material toward the first surface of the first sheet to impinge on the at least one Up-Conversion material to cause selected portions of the at least one Up-Conversion material to emit light.

The present invention also provides a method of displaying images, comprising the steps of: selectively moving at least one beam of radiation of one or more selected wavelengths in a direction defined as a first direction toward a surface defined as a first surface of a light emitting material selected from materials having an absorption band, a material capable of Up-Conversion into visible radiation and mixtures thereof; displacing the radiation beam and the light emitting material relative to one another during the practice of the selectively moving step to selectively impinging at least one radiation beam having a wavelength in the electromagnetic spectrum on the light emitting material to cause the light emitting material to emit light having a predetermined configuration, while preventing transmission of radiation of wavelengths within the absorption band in a direction toward a surface defined as a second surface of the light emitting material wherein the first surface is opposite to the second surface.

DESCRIPTION OF THE PREFERRED EMBODIMENTS

Figure 1:
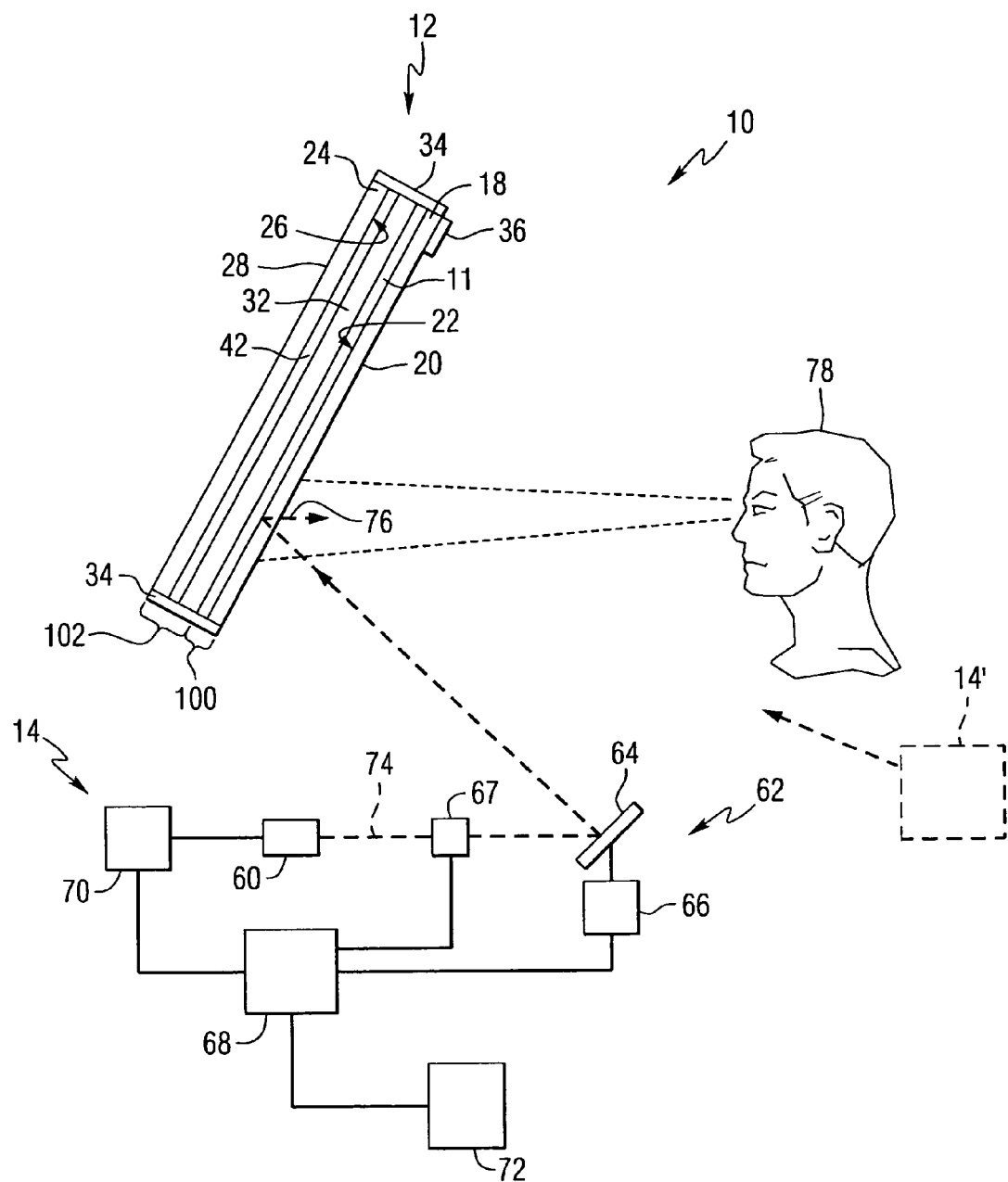
FIG. 1 is a schematic view (not to scale) of a head-up display system for a vehicle which incorporates features of the present invention.

Before discussing the non-limiting embodiments of the invention, it is understood that the invention is not limited in its application to the details of the particular embodiments shown and discussed since the invention is capable of other embodiments. Further the terminology used herein is for the purpose of description and not of limitation.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.6, or 3.4 to 9.3, or 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

The terms "head-up display", "head-up display system", "HUD" or "HUD system" as used herein is a system that displays information, such as an image, to a viewer while the viewer simultaneously views the real world around and through the displayed image. The terms "image display system" or "display system" as used herein means a system that includes a light emitting material and an electromagnetic source that is selectively modulated to direct an energy beam toward the light emitting material to selectively impinge on the light emitting material to display an image, e.g. but not limited to black and white, and/or colored stationary objects, moving objects, alphanumerical characters, to a viewer. Optionally and as discussed in detail below, the light emitting material can be mounted on a transparent substrate so that a viewer can view the real world around and through the light emitting material, or the light emitting material can have an opaque or translucent background so that a viewer can view the real world around but not through the light emitting material. As can now be appreciated an image display system includes a head-up display system. In the following discussion, a display system incorporating features of the invention will be discussed generally with reference to use in a head-up display system for a vehicle, such as an automobile. It is to be understood, however, that the specifically disclosed exemplary apparatus and method are presented simply to explain the general concepts of the invention and that the invention is not limited to these specific exemplary non-limiting embodiments of the invention. As would be appreciated by those skilled in the art, the invention can be practiced in many fields, such as but not limited to, laminated or non-laminated residential and/or commercial windows, insulating glass units, e.g. but not limited to insulating glass units for enclosures, e.g. but not limited to houses and commercial buildings and temperature controlled containers having a viewing area, e.g. refrigerators having a door with a viewing area, commercial signs, entertainment displays, advertising displays, monitors for televisions or computers, and/or transparencies for land, air, space, above water and under water vehicles, e.g., automotive windshields, sidelights, back lights, sunroofs, and moon roofs, just to name a few.

An exemplary non-limiting display system identified by the number "10" incorporating features of the invention is illustrated in FIG. 1. The display system 10 is a head-up display system for a vehicle and includes one or more light emitting materials 11 carried on a support 12, and a projection assembly 14. The components of the exemplary head-up display system 10 shown in FIG. 1 will first be described and then operation of the head-up display system 10 to practice an exemplary method of the invention will be described.

THE SUPPORT—The support 12 can be of any desired type, such as but not limited to, a single ply or a laminated article. In the exemplary embodiment shown in FIG. 1, but not to be considered as limiting to the invention, the support 12 is shown as a laminated article having a first ply or sheet 18 with a major surface 20 facing the vehicle interior, also referred to as inner major surface, and an opposed or outer major surface 22 facing the vehicle exterior, also referred to as outer major surface. The support 12 further includes a second ply or sheet 24 having an inner major surface 26 facing the vehicle interior, also referred to as inner major surface and an opposed outer major surface 28 facing the vehicle exterior, also referred to as outer major surface 28. The first and second plies 18, 24 can be secured together in a fixed relationship in any suitable manner, e.g. but not limiting to the invention, interlayer 32 can secure the plies in a fixed relationship, e.g. as is known in the automotive laminating art. A conventional edge sealant 34 can be applied to the perimeter of the laminated article during and/or after lamination in any desired manner to prevent edge damage to the plies 18, 24. A decorative band 36, e.g., an opaque, translucent or colored shade band, such as a ceramic band, can be provided on a surface of at least one of the plies 18, 24, for example and as shown in FIG. 1, around the perimeter of the inner major surface 20 of the first ply 18.

In the practice of the invention, the plies 18, 24 and the interlayer 32 of the support 12 can be of any desired material, e.g. the plies 18, 24 can be of the same or different material, and the plies 18, 24 and the interlayer 32 can have any desired optical characteristics. For example, the plies 18, 24 and/or interlayer 32 can be transparent, translucent or opaque to a wavelength or a wavelength range of the electromagnetic spectrum. By "transparent" is meant having a transmittance of a wavelength and/or a wavelength range of the electromagnetic spectrum of greater than 0% to 100%. By "translucent" is meant passing all or a portion of a wavelength and/or wavelength range of the electromagnetic spectrum but diffusing the passed wavelength such that viewed objects in the path of the passed wavelength are not clearly discernable. By "opaque" is meant having a transmittance of a wavelength and/or wavelength range of the electromagnetic spectrum of 0%.

As can be appreciated by those skilled in the art, the ultraviolet (also referred to as "UV" range (also referred to as "region" or "portion"), visible range (also referred to as "region" or "portion"), and infrared (also referred to as "IR") range (also referred to as "region" or "portion"), of the electromagnetic spectrum are set depending on the material though which the wavelengths travel. For measuring wavelengths passing through automotive transparencies, the UV range is about 180 to less than 380 nanometers ("nm"). Below 180 nm are the X-rays, gamma rays and cosmic rays. The invention contemplates generating wavelengths using mechanical instruments; therefore for purposes of the invention, unless indicated otherwise the UV range is 0 to less than 380 nm. For measuring wavelengths passing through automotive transparencies, the visible range is 380 nm to 760 nm. For purposes of the invention, unless indicated otherwise the visible range is 380 to 760 nm. For measuring wavelengths passing through automotive transparencies, the infrared ("IR") range of the electromagnetic spectrum is greater than 760 nm. Above 760 nm is the near infrared ("NIR") and the far infrared ("FIR"). For purposes of the invention, unless indicated otherwise, the IR range is greater than 760 nm and includes the NIR and FIR.

For automotive use, the first and second plies 18, 24 are each preferably a soda-lime-silicate glass however the invention is not limited thereto and other materials transparent to visible light, e.g. but not limiting the invention thereto porous glasses of the type sold by Corning Glass, borosilicate glasses, lead glasses, heavy-metal halide glasses and plastics, e.g. but not limiting the invention thereto polymethylmethacrylate, polycarbonate, polyurethane, polyethyleneterephthalate (PET), or copolymers of any monomers for preparing these, or mixtures thereof) can be used in the practice of the invention. The plies can be of any type and can be of any composition. The plies can have any optical properties, e.g., any value of transmission in the ultraviolet, visible or infrared range of the electromagnetic spectrum, and/or any sum of the combination of the transmissions, i.e. the total solar energy transmission. In the practice of the invention, but not limiting thereto, the plies are glass plies, and the glass plies or glass can be any type of glass, e.g. float, plate or rolled glass. Further the glass can be clear glass or non-clear glass. By "clear glass" is meant non-tinted or non-colored glass. By "non-clear glass" is meant the glass can be tinted or otherwise colored. The glass can be annealed or strengthened, e.g. thermally tempered, chemically tempered or heat strengthened. As used herein, the term "heat strengthened" means partially tempered. The first and second plies 18, 24 can each be clear glass or can be non-clear glass or one ply can be clear glass and the other non-clear glass. Although not limiting to the invention, examples of glass suitable for the first ply 18 and/or second ply 24 are described in U.S. Pat. Nos. 4,746,347; 4,792,536; 5,240,886; 5,385,872, and 5,393,593, which patents are hereby incorporated by reference. The first and second plies 18 and 24 can be of any desired dimensions, e.g., any desired length, width or thickness and/or any shape or configuration. For use in automotive transparencies, the first and second plies 18 and 24 can each be 1 millimeter ("mm") to 10 mm thick, e.g., less than 10 mm thick, e.g., 1 mm to 5 mm thick, e.g., 1.5 mm to 2.5 mm, e.g., 1.8 mm to 2.3 mm. The plies 18 and 24 of automotive laminated windshields are usually "float glass" or "flat glass". By "float glass" or "flat glass" is meant glass formed by the PPG Industries, Inc. or Pilkington float processes in which molten glass is deposited onto a molten metal bath and controllably cooled to form a float glass ribbon. The ribbon is then cut into pieces or sheets, and the pieces are shaped and/or heat-treated as desired. Examples of float glass processes are disclosed in U.S. Pat. Nos. 4,466,562 and 4,671,155 which patents are hereby incorporated by reference.

The interlayer 32 can be of any desired material and can include one or more layers or plies. As will be described in more detail below, the interlayer material can be or can include a material selected to block, absorb, or at least attenuate the transmission of electromagnetic energy of one or more selected wavelengths. In the fabrication of laminated transparencies, e.g. but not limiting to the invention, automotive windshields and sidelights, the interlayer 32 can be a plastic material such as, for example, polyvinyl butyral, plasticized polyvinyl chloride, polyurethane or multi-layered thermoplastic materials including polyethylene terephthalate, etc. Suitable interlayer materials are disclosed, for example but not limiting to the invention, in U.S. Pat. Nos. 4,287,107 and 3,762,988, which are patents are hereby incorporated by reference. In the exemplary embodiment shown in FIG. 1, the interlayer 32 is a single polyvinyl butyral ply having a thickness of 0.5 mm to 1 mm, e.g., 0.76 mm. The interlayer 32 secures the first and second plies 18 and 24 together, provides energy absorption, reduces noise, and/or increases the strength of the laminated structure. The interlayer 32 can also be a sound absorbing or attenuating material as described, for example, in U.S. Pat. No. 5,796,055, which patent is hereby incorporated by reference. Further, the interlayer 32 can have a solar control coating provided thereon or incorporated therein or can include a colored material to reduce solar energy transmission.

With continued reference to FIG. 1, a functional coating 42 can also be carried on any of the surfaces of the components, e.g. the plies 18 and 24, and interlayer 32 of the support 12. The functional coating 42 can be a coating, which affects the solar properties, e.g., emissivity, shading coefficient, transmission, absorption, reflection, etc., or conductive properties, e.g., thermal or electrical conduction, of the support 12. As used herein, the term "coating" includes one or more coating layers and/or coating films. The functional coating 42 can have one or more functional coating layers or films of the same or different composition or functionality. As used herein, the terms "layer" or "film" refer to a coating region of a desired or selected coating composition.

Examples of functional coatings include, but not to be considered as limiting to an electro conductive coating, a heatable coating, an antenna coating, or a solar control coating. As used herein, the term "solar control coating" refers to a coating which affects the solar properties of the coated article, such as but not limited to, shading coefficient and/or emissivity and/or the amount of solar radiation reflected and/or absorbed by and/or transmitted through the coated article, e.g., infrared or ultraviolet absorption or reflection. The solar control coating can block, absorb, or filter selected portions of the solar spectrum, such as but not limited to, the visible spectrum. Non-limiting examples of solar control and antenna coatings are disclosed in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,579, which patents are hereby incorporated by reference. Non-limiting examples of electro conductive coatings are disclosed in U.S. Pat. Nos. 5,653,903 and 5,028,759, which patents are hereby incorporated by reference.

In one exemplary embodiment, the functional coating 42 can be a low emissivity coating. As will be appreciated by one skilled in the art, a "low emissivity" coating is a coating having an emissivity equal to and less than 0.1 and usually equal to and below 0.05. Further as can be appreciated by one skilled in the art, different coating processes provide coatings with different emissivity values. For example, low emissivity sputter applied coatings typically have an emissivity in the range of 0.01 to 0.06, depending on the number of reflective metal layers present in the coating. Low emissivity pyrolytically applied coatings typically have an emissivity in the range of less than 0.03. Examples of low emissivity coatings, but not limiting to the invention thereto, are found in U.S. Pat. Nos. 4,952,423 and 4,504,109. The functional coating 42 can be a single layer or multiple layer coating and can include one or more metals, non-metals, semi-metals, semiconductors and/or alloys, compounds, composites, combinations, or blends thereof. For example, the functional coating 42 can be a single layer metal oxide coating, a multiple layer metal oxide coating, a non-metal oxide coating, or a multiple layer coating.

Non-limiting examples of functional coatings 42 which can be used with the invention are commercially available from PPG Industries, Inc. of Pittsburgh, Pa., under the families of coatings identified by the registered trademarks SUNGATE® and SOLARBAN®. Such functional coatings typically include one or more anti-reflective coating films including dielectric or anti-reflective materials, such as metal oxides or oxides of metal alloys, which are transparent or substantially transparent to visible light. The functional coating 42 can also include infrared reflective films having a reflective metal, e.g., a noble metal such as gold, copper, or silver, or combinations or alloys thereof, and can further include a primer film or barrier film, such as titanium, as is known in the art, located over and/or under the metal reflective layers.

In the exemplary embodiment shown in FIG. 1, the functional coating 42 is deposited over the inner major surface 26 of the second ply 24. However, it is to be understood that the functional coating 42 is not limited to this location. The functional coating 42 can be, for example, deposited over all or at least a portion of any of the major surfaces of the first ply 18 or second ply 24 or on or incorporated into the interlayer 32. The functional coating 42 can be deposited in any conventional manner, such as but not limited to, magnetron sputter vapor deposition (MSVD), chemical vapor deposition (CVD), spray pyrolysis (i.e., pyrolytic deposition), atmospheric pressure CVD (APCVD), low-pressure CVD (LPCVD), plasma-enhanced CVD (PECVD), plasma assisted CVD (PACVD), thermal or electron-beam evaporation, cathodic arc deposition, plasma spray deposition, and wet chemical deposition (e.g., sol-gel). The functional coating 42 can be of any desired type or thickness, such as a solar control coating having a thickness of 700 Å to 1000 Å. The functional coating 42 can have any number or type of infrared reflective layers, such as one, two or more silver layers.

Figure 2:
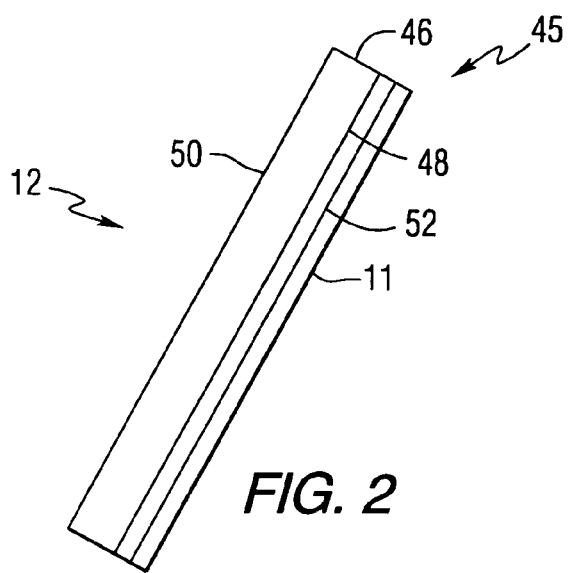
FIG. 2 is a side view (not to scale) of a support with fluorescent material incorporating features of the invention.

Although in the exemplary embodiment described above the support 12 is a laminated article having the light emitting material 11, e.g. fluorescent material located between the plies, it should be understood that the invention is not limited to this embodiment, e.g., the fluorescent material 11 can be located on an outer major surface of the laminated article or, as shown in FIG. 2, support 44 can be a "monolithic" article 45 with the light emitting material 11, e.g. fluorescent material located on at least a portion of one or more surfaces of the monolithic article 45. By "monolithic" is meant an article having a single structural substrate or primary ply, e.g., a glass ply. By "primary ply" is meant a primary support or structural member. For example, as shown in FIG. 2, the support 44 can be formed by a single ply 46 having a first major surface 48 and a second major surface 50 with the fluorescent material 11 deposited over or carried on all or at least a portion of at least one of the major surfaces 48, 50. The single ply 46 can be of any material having any desired optical characteristics, such as those described above. A protective coating (not shown in FIG. 2), e.g., a metal or metal oxide coating, can be deposited over the fluorescent material 11 to protect the fluorescent material 11 from chemical or mechanical wear. Alternatively or additionally, a functional coating 42 (shown only in FIG. 1), such as described above, can also be deposited over at least a portion of one or more of the major surfaces 48, 50 (either over or under the fluorescent material) to provide the support 44 with solar control features. An electromagnetic radiation absorbing material 52, such as the interlayer material described above or a similar material, can also be deposited over all or at least a portion of one or more of the major surfaces 48, 50 of the ply 46 to reduce or eliminate electromagnetic radiation of selected wavelengths passing through the support 44. It is also to be understood that in this embodiment (without a radiation absorbing material) the radiation from the radiation source 60 can be directed at the fluorescent material from either side of the support 44.

As discussed above, the supports 12 and 44 can be an automotive transparency. As used herein, the term "automotive transparency" refers to an automotive windshield, sidelight, back light, moon roof, sunroof, and the like. The automotive transparency can have a visible light transmission of any desired amount, e.g., greater than 0% to 100%, e.g., greater than 70%. For non-privacy areas, the visible light transmission can be greater than or equal to 70%. For privacy areas, the visible light transmission can be less than 70%.

THE LIGHT EMITTING MATERIALS—In the practice of the invention, the light emitting material may be applied to one or both of the surfaces of, or incorporated into the body of, the first ply 18, the second ply 24 and/or the interlayer 32. As used herein, the term "light emitting material" means a material that emits electromagnetic radiation in the visible range of the electromagnetic spectrum, i.e. 380 nm up to less than 760 nm. Exemplary light emitting materials suitable for the practice of the invention include fluorescent and phosphorescent materials. In one non-limiting embodiment of the invention, the light emitting material 11 absorbs electromagnetic energy of a first wavelength, e.g. but not limiting to the invention a first wavelength in the UV, visible or infrared regions of the electromagnetic spectrum and emits electromagnetic energy having a second wavelength different than the first wavelength, e.g. but not limiting to the invention a second wavelength at least in the visible region. As can now be appreciated, the first wavelength and the second wavelength can be from the same region of the electromagnetic spectrum, e.g. UV, visible or infrared. As can further be appreciated, the invention contemplates the light emitting material absorbing wavelengths in the visible region and emitting wavelengths in the visible region, e.g., but not limiting to the invention, impinging a wavelength of 545 nm (green light) and emitting a wavelength of 650 nm (red light). However, in the instance when the energy beam in the visible range passes through a transparent material and is incident on the light emitting material, the energy beam is reflected from the surfaces of the transparent material and visibly interferes with the viewing of the image displayed by the light emitting material. The interference problem is reduced when the energy beam in the visible range is normal to the surface of the transparent material.

In one non-limiting embodiment of the invention, the second wavelength(s), e.g. the emitted wavelength is (are) longer than the first wavelength(s), e.g. the incident wave length, i.e. the energy of the emitted photon(s) is lower than the energy of the absorbed photon(s) (hereinafter also referred to as "Stage I Conversion"). Preferably in the practice of the invention but not limiting thereto, the incident wavelength is not discernable by the viewer. As can be appreciated by those skilled in the art, a small percent of humans can detect a beam having a wavelength less than 400 nm of the electromagnetic spectrum. Therefore, although the visible portion of the electromagnetic spectrum is in the range of 380 to 760 nm, in the practice of the invention, the incident wavelength is in the range 0 to less than 400 nm of the electromagnetic spectrum (also referred to as the "broad UV range" or "broad UV region" or "broad UV portion"). In a non-limiting embodiment of the invention, the fluorescent material 11 absorbs energy (e.g., one or more wavelengths) within a region of the electromagnetic spectrum in the broad UV range, e.g. between greater than 0 to less than 400 nm, such as in a range of 325 nm to less than 400 nm, e.g., 350 nm to less than 400 nm, e.g., 397 nm. In Stage I Conversion, the portion of the electromagnetic spectrum or wavelength(s) of the electromagnetic spectrum absorbed by the light emitting material 11 is generally referred to herein as the "absorption band" of the light emitting material 11. The light emitting material preferably fluoresces or emits wavelengths at one or more wavelengths at least in the visible portion or region of the electromagnetic spectrum.

The light emitting material 11 for Stage I Conversion can be any type of light emitting material, such but not limited to one or more organic, organo-metallic, or inorganic light emitting (e.g., fluorescent and/or phosphorescent) materials, and can be present in any desired amount. An example of one fluorescent material 11 suitable for the practice of the invention is Uvitex® OB fluorescent material commercially available from Ciba Specialty Chemicals Corporation. Other suitable light emitting organic materials include stibene, styrene, and ethylene species supplemented with one or more heterocyclic substituents such as benzoxazolyl, v-triazolyl, oxadiazolyl, or s-triazinylamino groups. Other suitable inorganic light emitting materials include oxides, sulfides, or oxide-sulfides of metals that are "doped" with (i.e., include small amounts of) elements of another metal, e.g. $Y_2O_3$:Eu, $YVO_4$:Tm, ZnS:Mn, $Y_2O_2S$:Pr, and $Gd_2O_2S$:Tb. Further yttrium and gadolinium silicates activated by rare earths elements of the type discussed in "Luminophors Based on Yttrium and Gadolinium Silicates Activated by Rare-Earth Elements" by I. A. Bondar, A. A. Kolpakova, L. Ya. Markovskii, A. N. Sokolov and L. E. Tarasova, published in Izvesatiya Akademii Nauk USSR, Seriya Fizicheskaya (1969), 33(6), 1057–61 can be used in the practice of the invention. In general luminophors activated by $2Y_2O_3.SiO_2$, $Y_2SiO_5$, $Y_{4.67}(SiO_4)_3O$, and $Y_2Si_2O_7$ were prepared from pure Si and $Y_2O_3$ by fusion. The cathodoluminescence is most intense at 2 mole percent $Ce_2Si_2O_7$. It was also reported that the following phosphors have outstanding luminescence: $2Gd_2O_3.SiO_2$—Th, $Gd_2O_3.I_3$ $SiO_2$—Ce, and $Gd_2O_3 .3SiO_2$—Eu. The preceding information was obtained from SciFinder on Mar. 4, 2003. Still further, lutetia-based ceramic scintillator discussed in "A New Lutetia-based Ceramic Scintillator for X-ray Imaging" by A. Lempicki, C. Brecher, P. Szupryczynski, H. Lingertat, V. V. Nagarkar, S. V. Tipnis and S. R. Miller published in Nuclear Instruments & Methods in Physics Research, Section A: Accelerators, Spectrometers, Detectors, and Associated Equipment (2002), 488(3), 579–590 can be used in the practice of the invention. The scintillator or phosphor is based on a transparent ceramic of $Lu_2O_3$:Eu. The preceding information was obtained from SciFinder dated Mar. 4, 2003. Additional nonlimiting phosphors that can be used in the present invention include $Lu_2SiO_5$:Ce, $Y_2SiO_5$:Ce, and $GdSiO_5$:Ce.

As can be appreciated, practicing non-limiting embodiments of Stage I Conversion of the invention on transparent substrates, e.g. applying the light emitting material on a transparent substrate such as but not limited the invention thereto an automotive windshield, and practicing the non-limiting embodiments of the invention in an environment that has UV radiation, e.g. outdoors such as but not limiting the invention thereto driving an automobile on a sunny day may result in the UV radiation in the environment uncontrollably energizing the light emitting materials. To eliminate this limitation, a UV blocking material, e.g. but not limiting the invention thereto a glass and/or plastic ply containing a UV absorbing material, e.g. cerium, titanium polyvinyl butyral or applying a coating on the glass and/or plastic plies provided between the light emitting material and the source of the UV radiation prevents the UV radiation from impinging on the light emitting material. In the alternative, an opaque layer may be provided between the light emitting material and the uncontrolled source of the UV radiation, e.g. the environment.

In another non-limiting embodiment of the invention, the second wavelength(s), e.g. the emitted wavelength is (are) shorter than the first wavelength(s), e.g. the absorbed wavelength (also referred to as "Stage II Conversion" or "Up-Conversion"). For example, but not limiting to the invention, the light emitting material 11 absorbs electromagnetic energy in a portion of the visible range and the infrared range of the electromagnetic spectrum, or absorbs two different or the same wavelengths in the IR region, and emits electromagnetic radiation in the visible range of the electromagnetic spectrum, i.e. 380 nm to 760 nm. A very small percentage of humans can see wavelengths in the range of 380 to 400 nm and 700 to 760 nm of the electromagnetic spectrum; therefore in the practice of the invention it is preferred to have the emitted radiation from light emitting material for the Stage I Conversion and the Stage II Conversion in the wavelength range of 380 to less than 760, and more preferably, in wavelength range of 400 to 700 nm.

The theory of Up-Conversion is well known in the art, e.g. see "Up-Conversion use for Viewing and Recording Infrared Images" S. A. Pollack et al., Applied Optics, Vol. 26, No. 20, Oct. 15, 1987, pages 4400–4406, and Downing et al., *Science*, 273, 1185, Aug. 30, 1996, the entire content of the documents are hereby incorporated by reference. Only a brief discussion will be presented herein. More particularly, in a non-limiting embodiment of the invention, an electron of the light emitting material is energized to a first energy level, thereafter energized a second, third or more times to raise or up convert the electrons to a desired energy level. For example, host systems of the type discussed in the article by Pollack identified above have Er3+ ions up convert 980 nm and 1500–1600 nm radiation into 545 nm green radiation and 660 nm red radiation, respectively. The energy input to the light emitting material can be determined from the formula $E=hc/\lambda$ where h is Planck's constant, c is the speed of light and $\lambda$ is the wavelength of the desired visible wavelength, e.g. for green light the wavelength is 545 nm. The light emitting material 11 for Stage II Conversion can be any type of light emitting material, such but not limited to one or more organic, organo-metallic, or inorganic light emitting (e.g., fluorescent and/or phosphorescent) materials discussed above for Stage I conversion, and can be present in any desired amount. Examples of light emitting material 11 suitable for the practice. Stage II Conversion of the invention include but are not limited to $Tm^{3+}$ and $Er^{3+}$ incorporated into various host crystals. Optionally $Yb^{3+}$ ions can be used as a sensitizer to boost the efficiency of the Up-Conversion process, e.g. $Tm^{3+}$—$Yb^{3+}$ systems upconvert 970 nm radiation into 470 nm blue radiation. Systems employing $Er^{3+}$—$Yb^{3+}$ ions upconvert 980 nm and 1500–1600 nm radiation into 545 nm green radiation and 660 nm red radiation respectively. It is possible to change the emission color either by changing the intensity of the excited radiation or the excitation wavelength, thus producing color modulation and color tuning effects. Preferably but not limiting to the invention, in the practice of Stage II Conversion two radiation beams in the IR region are used. However in the instance when one of the beams is in the visible region and when the light absorbing material is used with a transparent substrate, the radiation beam is preferably normal to the substrate surface. Because Stage II Conversion requires pumping radiation, e.g. energizing the light emitting material by the absorption of two or more photons of the same or different wavelengths, there is no need to block the environment from the light emitting material as was recommended for the Stage I Conversion. However, an opaque layer may be used to make the image generated by the light emitting material more distinguishable, e.g. an image on a solid colored background.

As will be understood by one of ordinary skill in the art, the particular light emitting material utilized for Stage I and Stage II Conversions can be selected based on the electromagnetic radiation source used in the projection assembly 14 described below and/or by the desired wavelength of the light emitted from the light emitting material 11, such as to produce an image of one or more desired colors. In one non-limiting embodiment of the invention, the light emitting material 11 is carried on all or at least a portion of the supports 12 and 44, e.g., on all or at least a portion of one or more surfaces of one or more of the components, e.g. plies 18, 24, and interlayer 32 of the support 12. Alternatively, the light emitting material 11 can be incorporated into the materials of the plies 18, 24, and/or the interlayer 32. The light emitting material 11 can be applied in any conventional manner to all or a portion of one or more surfaces of the plies 18, 24, and/or interlayer 32. Several techniques that may be used but are not limiting to the invention, include the following. The light emitting material 11 can be dissolved in a solvent or the dyes in the form of a powder and can be mixed with a binder, e.g. optical epoxy transparent to the exciting energy and applying the resultant solution applied onto the surface of a substrate, e.g. the plies 18, 24, and interlayer 32 by spraying, dipping, or rolling. Techniques of providing the light emitting material in a liquid state include mixing the material in a sol gel or encapsulating the material in a dendrimer. In the latter case the dye, e.g. the light emitting material or dye and a solvent are mixed together. To increase the darkness of the color, the ratio of dye to solvent is increased. Dendrimers are then added to the solvent. The solvent selected should dissolve the dye and should at least soften the dendrimer so that the dye is captured in the structure of the dendrimer. The solvent is evaporated or the solute filtered from the solution. The residue from the evaporation or the filtered material is dried and crushed into a powder. The powder may be processed as any powdered dye is processed. For a further discussion on dendrimers reference can be made to the article "Laser emission from high-gain media of dye-doped dendrimer" by Shiyoshi Yokoyama, Akira Otomo and Shino Mashiko, Applied Physics Letters Vol. 80 No. 1. 7 Jan. 2002, pages 7–9, the entire document is hereby incorporated by reference.

Alternatively, light emitting material crushed into powder, e.g. powdered dendrimer containing dyes can be press-applied onto one or more major surfaces of the interlayer 32, or in the case of glass plies may be mixed with the molten glass during the glass making process. The light emitting material maybe applied to a surface of the substrate, e.g. plies 18, 24, or interlayer 32 by any conventional coating method, e.g. by sputter coating, coating vapor deposition or spray pyrolysis and any of the coating processes discussed below. More particularly, a thin film coating of a Europium, Thulium, Erbium, Ytterbium or other rare earth element doped oxide host, e.g. Yttria Partially Stabilized Zirconia. The processes of sputter coating, coating vapor deposition and spray pyrolysis and those identified in this discussion are well known and no further discussion is deemed necessary. In the exemplary laminated support 12 shown in FIG. 1, the light emitting material 11 can be located between the first ply 18 and the second ply 24, e.g., between the first ply 18 and the interlayer 32. The light emitting material 11 can form a continuous coating layer on all or at least a portion of the components of the supports 12 and 44. Alternatively, the light emitting material 11, e.g. fluorescent material can be present in discreet sections or areas of the components or can be present in non-film form, such as inorganic crystalline powders or organic light emitting materials deposited on or carried on the components of the supports. Materials for Stage II Conversion preferably include, but are not limited to heavy-metal halide glasses, which are based on elements of zirconium, barium, hafnium, indium, zinc, cadmium, e.g. a glass sold under the mark ZBLAN having a composition of 53% $ZrF_4$, 20% $BaF_2$, 4% $LaF_3$, 3% $AlF_3$ and 20% NaF and variations thereof which include anions of Cl, Br, I and cations of other heavy metals; chalcogenide glass having far-infrared transparency, e.g. beyond 20 microns (2000 nm); alkali metal crystals which can be ground into nanometer sized particles and mixed with material having a melting temperature lower than the crystals, e.g. plastics, and soda-lime-silica glasses. As can be appreciated by those skilled in the art of Stage II Conversion, $SiO_2$ glasses are generally not preferred hosts for up-Conversion fluorescence because of the high non-radiative losses; however its ease of manufacture and heat treating makes the glass surfaces suitable for supporting coatings and layers having Up-Conversion fluorescent materials and to induce very localized phase transitions in the glasses on a micro-crystalline level, using rare earth ions as nucleation sites.

THE PROJECTING ASSEMBLY—With continued reference to FIG. 1, and as discussed above, the display system 10 of the invention, e.g., the head-up display system, can also include the projection assembly 14. Although not limiting to the invention, one exemplary projection assembly 14 is schematically shown in FIG. 1 and includes an energy source or radiation source 60, e.g., an electromagnetic radiation source capable of emitting radiation, e.g., electromagnetic radiation, of one or more selected wavelengths within at least a portion of the absorption band of the light emitting material 11, e.g. fluorescent material. As used herein, the term "selected wavelength" means a single wavelength, e.g. but not limiting to the invention, for Stage I Conversion, or a range of wavelengths, e.g. but not limiting to the invention for Stage II Conversion within the absorption band of the fluorescent material 11. Radiation sources that can be used in the practice of the invention but not limiting thereto include electron guns, e.g. of the type used with CRT tubes, UV emitting lamps, LED's, lasers, pump lasers and laser diodes. As can be appreciated by those skilled in the art, it is preferred to direct one or more beams of energy having the selected wavelength toward the fluorescent material to provide an image having sharp lines. In the practice of the invention, the beams of energy can be collimated or focused beams. In the instance where the radiation source emits non-collimated beams of energy, lens may be used to collimate or focus the beams of energy. In one exemplary embodiment of the invention relating to Stage I Conversion, the radiation source 60 is a laser or laser diode capable of emitting electromagnetic radiation of one or more selected wavelengths or wavelength ranges, for example, but not limiting to the invention, 300 nm to 500 nm; 325 nm to 425 nm; 350 nm to 410 nm; 390 nm to 400 nm, or 397 nm. In an exemplary embodiment of the invention relating to Up-Conversion, the radiation source 60 is a pump laser, LED's, laser or laser diode capable of emitting electromagnetic radiation of two or more selected wavelengths, e.g. one wavelength in the visible range, e.g. 380 to 760 nm and the remaining wavelengths in the IR range, e.g. 760 or all of the wavelengths in the IR range. As can be appreciated, radiation sources operating in the UV, visible and infrared range may be used in the practice of the invention. However, it will be understood by one of ordinary skill in the art that the selected wavelength of the radiation source 60 can be selected based on the specific fluorescent material 11 utilized so that all or at least a portion of the selected wavelength range is at least partly within the absorption band of the fluorescent material 11 being used. Suitable radiation sources for Stage I Conversion include, but are not limited to Model PPM04 (LD1349) and Model PPMT25/5255 (LD1380) laser diodes commercially available from Power Technologies, Inc. The radiation sources can be of any desired power output, such as 5 milliwatt ("mW") to 100 mW, e.g., 5 mW to 30 mW. Other suitable radiation sources are commercially available from Edmund Industrial Optics and Coherent Auburn Division. Suitable radiation sources for Stage II Conversion include, but are not limited to low power infrared laser diodes or LED's, e.g. an infrared laser operating at 1.54 micrometers, available from any laser manufacturer e.g., but not limited to Chesapeak Laser System, Inc., of Lantham, Md. and Kigre, Inc., of Toledo, Ohio. As a general rule, as the output power of the radiation source increases, the brightness of the fluorescent image produced also increases.

The projection assembly 14 can include a directing system 62 (e.g., a scanner) to the direct or scan radiation emitted from the radiation source 60 toward the fluorescent material 11. The directing system 62 can include one or more directors 64, such as a mirror or combination of two or more mirrors, each movably mounted on a movement device 66, such as a conventional mechanical or electrical positioning device. For example, the director 64 can include two mirrors, one for vertical movement and one for horizontal movement of radiation from the radiation source 60. Other directing systems include, but are not limited to ferroelectric domain scanners of the type discussed in the article "Guided-wave Electro-Optic Beam Deflector Using Domain Reversal in LiTaO$_3$" by Qibiao, Yi Chiu, David N. Lambeth, T. E, Schelesinger and Daniel D. Stancil, published in the Journal of Lightwave Technology, Vol. 12, No. 8, August 1994, and in Ferroelectric Laser Scanner by David A. Scymgeour, Alok Sharan, Venkatraman Gopaian, Kevin T. Gahagan, Joanna L. Casson, Robert Sander, Jeanne M. Robinson, Fikri Muhammad, Premanand Chandramani and Fouad Kiamiliev, published in Applied Physics Letters (2002), 81(17), 3140–3142 presented in SciFinder dated Mar. 4, 2003, the documents in their entirety are hereby incorporated by reference. As will be described in more detail below, the movement device 66 is configured to move the director 64 to selectively direct the radiation emitted from the radiation source 60 toward one or more selected areas of the fluorescent material 11. A suitable director 64 is a Model 6800HP scanner commercially available from Cambridge Technology, Inc.

A blocking device 67 can be located between the radiation source 60 and the directing system 62. For example, the blocking device 67 can be an electro-optical modulator, an electromechanical device, or a similar device to selectively block and unblock radiation from the radiation source 60 passing to the directing system 62. For example, the blocking device 67 can include a crystal that switches from being transparent to the selected wavelength(s) to being opaque to the selected wavelength(s) by the application of a voltage. Another blocking device that can be used in the practice of the invention is a deflector, which deflects or sweeps the energy beam at an accelerated rate away from the directing system onto an opaque surface.

In the practice of Stage II Conversion, two projection assemblies 14 can be provided, or one projection assembly having two lasers of the same or different wavelengths can be provided, or one projection assembly having one laser capable of emitting radiation in two wavelengths can be provided, for the pump-up of the light emitting material.

The radiation source 60 and/or the directing system 62 and/or blocking device 67 can be connected to a controller 68, such as a conventional computer or electronic control device. The controller 68 can be configured to energize the movement device 66 and to move the director 64 to direct the radiation from the radiation source 60 toward the fluorescent material 11 to form patterns or images, as described below. Additionally, the controller 68 can modulate the power of the radiation source 60 to vary the intensity of the energy beam from the radiation source. In one embodiment, the controller 68 is configured to activate and deactivate the blocking device 67 to block and unblock at least a portion, e.g., all, of the radiation from the radiation source 60 passing to the director 64. If the blocking device 67 is not present, the controller 68 can be configured to energize and deenergize the radiation source 60 as described below. An example of a suitable controller is a FieldGo portable computer commercially available from Broadax Systems, Inc. Suitable control software includes Microsoft® operating software, e.g., Windows 95®. Suitable imaging software includes "Laser Show Designer for Windows: Professional 2.86" commercially available from Microsoft).

The radiation source 60, directing system 62, blocking device 67, and/or controller 68 can be in electronic communication with a conventional power source 70, such as a battery or electrical generator, to supply power to the components of the projection assembly 14. Additionally, the controller 68 can be in electronic communication with one or more vehicle operating systems 72, such as automotive speed sensing systems, alarm systems, global positioning systems, electronic sending or receiving systems, and the like to display the information generated by the operating systems 72 on the support 12.

In one non-limiting embodiment, the fluorescent material 11 is associated with the first ply 18, e.g. on the surface 22 of the first ply 18 or between the surfaces 20 and 22 of the first ply 18. The material of the interlayer 32 and/or of the ply 24 can be selected and/or a material applied to the surfaces of the ply 24 and interlayer 32 to absorb some or all of the electromagnetic radiation from the radiation source 60 impinging on the support 12 such that little or no electromagnetic radiation from the radiation source 60 incident on the ply 18 of the support 12 passes through the support 12, e.g., to the outside of the vehicle during the practice of Stage I and Stage II conversation. In addition to limiting the radiation incident on the support from passing through the support, the interlayer 32 and ply 24 can limit radiation from the environment on the opposite side of the support that may fluoresce the material 11 during the practice of Stage I Conversion, e.g. from outside the vehicle from passing through the support 12.

As will be appreciated by one of ordinary skill in the art, the amount of electromagnetic radiation that passes through the support 12 will depend upon several factors, such as the thickness and/or composition of the plies 18, 24, the thickness and/or composition of the interlayer 32, the amount and/or composition of the fluorescent material 11, and the wavelength(s) of the electromagnetic radiation emitted by the radiation source 60. Thus, the laminated support 12 shown in FIG. 1 and described above can provide a first portion 100, which is transparent or substantially transparent to the electromagnetic radiation emitted by the radiation source 60 and a second portion 102 that is non-transparent or substantially non-transparent to the electromagnetic radiation emitted by the radiation source 60. By "substantially transparent to the electromagnetic radiation emitted by the radiation source 60" is meant that at least 50% of the electromagnetic radiation emitted by the radiation source 60 and in the absorption band of the fluorescent material for Stage I Conversion and for the pump-up for stage II Conversion passes through the support 12, for example more than 70%, such as more than 80%, e.g., in the range of 50% to 100%. By "substantially non-transparent to the electromagnetic radiation emitted by the radiation source 60" is meant that less than 50% of the electromagnetic radiation emitted by the radiation source 60 and in the absorption band of the fluorescent material for Stage I Conversion and for the pump-up for Stage II Conversion passes through the support 12, for example less than 35%, such as less than 20%, e.g., in the range of 0% to 50%.

The interlayer 32 and/or the ply 24 may be adjusted to be substantially non-transparent to the electromagnetic radiation emitted by the radiation source 60 by providing a function a coating on one or more surfaces of the interlayer and/or ply 24 that reflects the wavelength, e.g. but not limiting to the invention a coating having an infrared reflective film such as gold or silver, utilizing a colored or tinted, i.e., non-clear, material for the interlayer and/or ply 24, and/or adding a material, e.g. cerium that wavelengths of the electromagnetic spectrum in the UV range. As can be appreciated, applying the fluorescent material to the inner surface 20 of the ply 18, provides for applying a material substantially non-transparent to the electromagnetic radiation emitted by the radiation source 60 to the outer surface 22 of the ply 18 and/or adding the material to the body of the ply 18 as discussed above for the ply 24 and interlayer 32. Further as can be appreciated, an opaque material can be added between the portion and area of the fluorescent material 11 on which the image is to be displayed and the outer surface 28 of the ply 24.

An exemplary method of practicing Stage I Conversion of the invention will now be described with particular reference to the exemplary head-up display having the laminated support 12 shown in FIG. 1. The controller 68 energizes the radiation source 60 to emit a beam 74 of electromagnetic radiation of one or more selected wavelengths toward the director 64. Assuming the blocking device 67 is in a deenergized or "open" mode, at least a portion, e.g., all, of the emitted radiation passes through the blocking device 67 and onto the director 64. The director 64 redirects this energy beam 74 toward the fluorescent material 11 located on the support 12. The fluorescent material 11 absorbs at least a portion of the electromagnetic radiation and then fluoresces, i.e., emits energy 76, such as energy in the visible region of the electromagnetic spectrum, which can be seen by the occupant 78 of the vehicle. The occupant or viewer 78 can be the vehicle driver or one or more of the passengers.

The controller 68 directs the movement device 66 to point the director 64 to different areas of the fluorescent material 11 to cause these selected areas of the fluorescent material 11 to fluoresce to form an image visible to the occupant 78. The controller 68 can vary the output, e.g., the power or beam intensity, of the radiation source 60 to cause different areas of the fluorescent material 11 to fluoresce at different levels of brightness. For example, in one exemplary embodiment the director 64 can raster the direction of the radiation beam 74 along a portion or all of the fluorescent material 11. By "raster", is meant to form a scan pattern, e.g., by scanning an area from side to side in lines from top to bottom or bottom to top. As the scan pattern is formed, the controller 68 can selectively energize and deenergize, i.e., open and close, the blocking device 67 to form adjacent fluorescent and non-fluorescent areas on the support 12 to thereby form one or more fluorescent images discernable by the driver. In an alternative embodiment in which no blocking device 67 is present, the controller 68 could energize and deenergize the radiation source 60 to form the fluorescent images.

Figure 3:
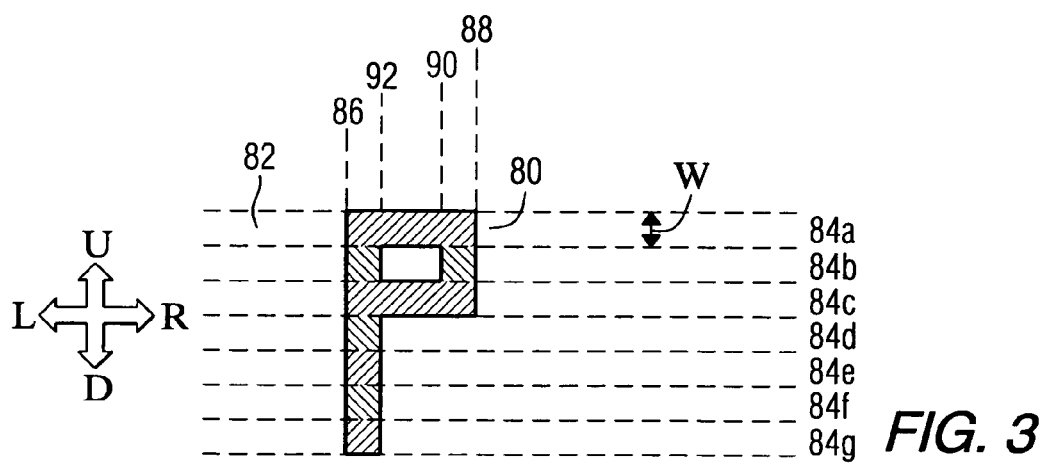
FIG. 3 is a front view of a fluorescent image formed in accordance with the teachings of the present invention.

The shaded area in FIG. 3 depicts an exemplary fluorescent image 80 in the form of the letter "P" formed on a portion 82 of the support 12. In one exemplary method of forming this image 80, the director 64 is moved in first and second directions, e.g., from side to side (as depicted by directions L and R), and is displaced in a substantially perpendicular direction, e.g., up and down (as depicted by directions U and D), to form a scan pattern or a plurality of scan paths 84$a$ to 84$g$. For purposes of the present explanation only and not limiting to the invention, the individual scan paths 84$a$ to 84$g$ are depicted as being separated by dashed lines in FIG. 3. However, it will be understood that these dashed lines are simply for explanation purposes only and would not be visible during actual operation. The width (W) of the scan paths 84$a$ to 84$g$ can correspond to a width of the beam 74. Adjacent scan paths can be overlapping, i.e. the perpendicular displacement of the director 64 (in the U or D directions) can be less than the width of the beam 74. On the other hand, the perpendicular displacement of the director 64 can be greater than the width of the beam 74 so that a gap is formed between adjacent scan paths (not shown).

In one exemplary method of forming the image 80 practicing Stage I Conversion, the director 64 can be traversed from left to right with respect to FIG. 3 along the uppermost scan path 84$a$ with the blocking device 67 energized, i.e., closed. When the director 64 reaches a position equivalent to position 86, i.e., when the director 64 is pointing to position 86, the blocking device 67 can be deenergized while the director 64 continues to traverse to the right (direction R) so that the region of the uppermost scan path 84$a$ from position 86 to position 88 fluoresces. At position 88, the blocking device 67 can be energized (closed) for the remainder of the scan path 84$a$ (i.e., until the director 64 reaches the end of the scan path 84$a$). The director 64 can then be displaced in direction D to the next scan path 84$b$ and moved in direction L along the scan path 84$b$ to position 88 where the blocking device 67 is again deenergized (opened) from position 88 to position 90. At position 90, the blocking device 67 is energized (closed) until position 92 when the blocking device 67 is again deenergized (open) from position 92 to position 86. At position 86, the blocking device 67 is energized (closed) for the remainder of the scan path 84b, at which time the director 64 is again displaced in direction D to the next scans path 84c. In this manner, the fluorescent image 80 can be formed. While the formation of only a single letter is described above, it will be understood that adjacent letters, words, sentences, numbers, symbols, or images could be formed in a similar manner.

In one exemplary method of forming the image 80 practicing Stage II Conversion, the director 64 directs two laser beams of different wavelengths to pump-up the light emitting material. The radiation of the first laser beam is incident on the light emitting material followed by the radiation of the second laser beam incident on the light emitting material. The director 64 can be traversed from left to right with respect to FIG. 3 along the uppermost scan path 84a with the blocking device 67 energized, i.e., closed. When the director 64 reaches a position equivalent to position 86, i.e., when the director 64 is pointing to position 86, the blocking device 67 can be deenergized while the director 64 continues to traverse to the right (direction R) so that the region of the uppermost scan path 84a from position 86 to position 88 of the light emitting material is in the pump-up condition and fluoresces. At position 88, the blocking device 67 can be energized (closed) for the remainder of the scan path 84a (i.e., until the director 64 reaches the end of the scan path 84a). The director 64 can then be displaced in direction D to the next scan path 84b and moved in direction L along the scan path 84b to position 88 where the blocking device 67 is again deenergized (opened) from position 88 to position 90. At position 90, the blocking device 67 is energized (closed) until position 92 when the blocking device 67 is again deenergized (open) from position 92 to position 86. At position 86, the blocking device 67 is energized (closed) for the remainder of the scan path 84b, at which time the director 64 is again displaced in direction D to the next scan path 84c. In this manner, the fluorescent image 80 can be formed. While the formation of only a single letter is described above, it will be understood that adjacent letters, words, sentences, numbers, symbols, or images could be formed in a similar manner. As can be appreciated, the invention contemplates blocking the beam from one laser to prevent the pump-up to display the image.

It is also to be understood that the image forming method of the invention is not limited to the above-described exemplary rastering embodiment. For example, while in the above-described method the director 64 is alternately moved laterally from left to right and right to left across the fluorescent material 11 while energizing and deenergizing the blocking device 67 to form the image 80, the director 64 could alternatively be laterally moved in only one direction while forming the image 80, e.g., always to the right or always to the left while forming the scan pattern in similar manner to the movement of an electron beam in a conventional cathode ray tube image system. For example, the director 64 could start on the upper left scan path 84a and scan to the right while energizing and deenergizing the blocking device 67. At the end of the scan path 84a, the blocking device 67 can be energized (closed), the director moved to the left and down to the left side of the next scan path 84b, and then the director 64 moved to the right along the second scan path 84b while energizing and deenergizing the blocking device 67. Further, rather than starting at the top of the scan pattern and moving downwardly, the image 80 could be formed by starting at the bottom of the scan pattern and moving the director 64 to direct the radiation beam 74 upwardly. Additionally, rather than moving the director 64 across the entire field of the fluorescent material 11, the director 64 could be used to "paint" an image, i.e., the director 64 could be moved or directed by the controller 68 to only trace over or within the actual area of the pattern or image to be formed. For example, to form the letter "P", the director 64 would point, e.g., direct the beam 74, only to the area within the confines of the letter "P" rather than sweeping the director 64 over the area outside of the area forming the fluorescent letter "P" which is to remain non-fluorescent. As will be appreciated by one of ordinary skill in the art, the invention is not limited to the type of rastering or scanning process used to form the image 80. For example, rather than the horizontal scanning methods described above, using can form the scan pattern vertical scan paths with lateral displacement at the end of the vertical scan path. Diagonal scan paths could even be used, if desired.

Alternatively, in an embodiment without the blocking device 67, the radiation source 60 could be energized and deenergized during formation of the scan pattern on the fluorescent material 11 to form a desired image.

As discussed above, for a vehicle head-up display the controller 68 can be in electronic communication with various on-board vehicle systems 72 to utilize the projection assembly 14 to form desired fluorescent images on the support 12. Examples of such images can include vehicle speed, vehicle system indicator lights (such as oil, generator, tachometer, etc.), navigational information from a global positioning satellite ("GPS") system, and a vehicle security system. For example, the controller 68 can be designed such that should the vehicle security system be activated, the radiation source 60, blocking device 67, and director 64 are controlled to fluoresce at least a portion of the fluorescent material 11 on the support 12 and/or to form particular phrases which would be readable by those outside the vehicle, such as "help" or "please notify police", etc. As a further example, the controller 68 can be in electronic communication, e.g., by radio wave, with a hand-held or pocket device, such as a key chain having a small radio wave transmitter, so that when the pocket device is activated, the horn sounds and/or the controller 68 activates the radiation source 60, blocking device 67 and directing system 62 to cause at least a portion of the fluorescent material 11 to fluoresce. This would be particularly useful in locating the vehicle in a crowded parking lot if the driver could not remember exactly where he parked the vehicle. In an additional example, images from video cameras operating in any wavelength range, such as visible or infrared, could be projected onto the support 12 carrying the fluorescent material 11 to form an image. In this manner, infrared cameras mounted on the vehicle could aid vision at night or under adverse weather conditions. Cameras, e.g., mounted on vehicles, could also supplement vision available in the conventional fashion through windows and in mirrors. As will be appreciated by one of ordinary skill in the art, more than one light emitting material, e.g., fluorescent material 11 can be carried on the support 12. The different fluorescent materials can be selected to fluoresce at different wavelengths or at different ranges of wavelengths and, hence, to fluoresce at different visible colors. A plurality of projection assemblies having different radiation sources 60 (the radiation sources 60 having respective output wavelengths within the absorption bands of the respective fluorescent materials) with respective directing systems 62 could be positioned in the vehicle so that different types of data can be displayed with different fluoresced colors. In FIG. 1, an optional second projection assembly 14' is shown in dotted lines. For example, a first radiation source and fluorescent material combination can be utilized to display a first type of information, such as vehicle speed, by forming images of a first color, e.g., blue fluorescent images, on the support. This means that at least a portion of the fluorescent material on the support absorbs electromagnetic radiation in the wavelength or wavelength range emitted by the first radiation source and fluoresces at a selected visible wavelength or range in the blue region of the visible electromagnetic spectrum.

Another source of information, such as vehicle status indicators, can be displayed using a second projection assembly having a second radiation source that is configured to fluoresce a second fluorescent material present on the support at a selected wavelength or range in a second color region, e.g., the yellow region, of the visible electromagnetic spectrum. If different fluorescent materials are deposited on the support, it would also be possible utilizing different laser devices to form colored images by simultaneously irradiating the fluorescent materials such that the fluoresced light from the different fluorescent materials combine to form a selected color. In the example described immediately above, the two fluorescent materials can be simultaneously irradiated such that the resultant blue and yellow fluoresced images combine to form a green colored image. In the Stage II Conversion, a pump laser can be used with a Up-Conversion fluorescent material having two or more different colors at different energy levels to provide two or more colors, e.g. erbium for red and green colors with one fluorescent material and one laser. Alternatively, a single fluorescent material 11 that fluoresces over a range of wavelengths dependent upon the wavelength(s) of the absorbed radiation can be provided on the supports 12 and 44. For example, the fluorescent material 11 can fluoresce at one or more first fluorescent wavelength(s) (e.g., in the blue region of the electromagnetic spectrum) when irradiated by electromagnetic energy of one or more first irradiation wavelength(s) and fluoresce at a second fluorescent wavelength(s) (e.g., in the yellow region of the electromagnetic spectrum) when irradiated by electromagnetic energy of one or more second irradiation wavelength(s). In a still further embodiment, the plurality of radiation sources 60 described above can be substituted with a single radiation source capable of selectively emitting electromagnetic energy of two or more desired wavelengths or ranges or wavelengths such that the single radiation source is capable of providing electromagnetic energy in the absorption band(s) of the one or more fluorescent materials 11 to form separate images of differing color and/or an image of a desired (combined) color as described above.

Figure 4:
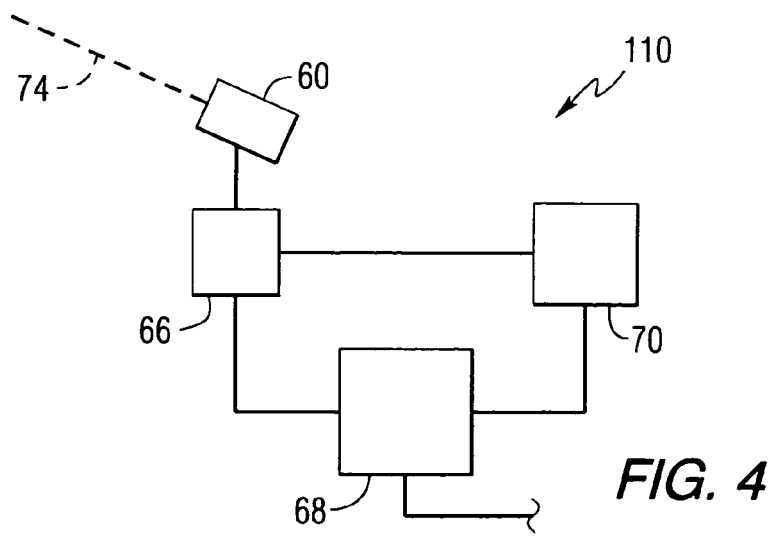
FIG. 4 is a schematic view (not to scale) of an alternative embodiment of a projecting assembly for use with a head-up display system of the invention.

An alternative projection assembly 110 of the invention is shown in FIG. 4. This projection assembly 110 is similar to the projection assembly 14 shown in FIG. 1 but the radiation source 60 is directly and movably connected to the movement device 66 so that the radiation source 60 can be moved and simultaneously energized and deenergized to form fluorescent images on the support 12 in similar manner as described above.

For use in a conventional automobile, the projection assemblies described above can be located in or under the vehicle dashboard, with the dashboard having a slot or opening of sufficient size to permit the beam 74 of the projection system 110 (FIG. 2) and the beam from the detector 64 (FIG. 1) to pass through. Although not limiting to the invention, for the display system 10 shown in FIG. 1, respectively, the radiation source 60 of the detecting system 62 directs a beam of light along a path toward the inner surface 20 of the ply 24 of the support 12 which is the same side of the support as is viewed by occupant 78 of the vehicle, therefore in this non-limiting embodiment of the invention, the path of the beam of light from the radiation source, e.g. from the director 64 toward the support 12 is different than the viewing path of the occupant observing the generated image. The invention, however, is not limited to placement of the projection assembly at the location shown in FIG. 1. For example, if the display system 10 of the invention were incorporated into a side window, rear window, moon roof, etc., the projection assembly could be placed at any desired location in the vehicle to allow operation of the display device 10 as described above. Also, the controller 68 can be configured to vary the application of the energy from the radiation source 60 to modify the resultant fluorescent image to adjust for variations in curvature of the support 12.

While the above discussion was directed primarily to utilization of the invention in a vehicle head-up display, the invention is not limited to this use. As discussed, the invention is not limited to use with vehicle or automotive transparencies. For example, the supports 12 and 44 shown in FIGS. 1 and 2 can be a residential or commercial window, an advertising display, or a commercial sign configured to display fluorescent images in a similar manner as described above. Further, the supports 12 and 44 can be a pane of a conventional insulating glass unit or can be the insulating glass unit. The supports 12 and 44 upon which the fluorescent material 11 is carried can be a transparent article, a translucent article, or an opaque article. The amount of material 11 can be any amount to provide a desired level of brightness, i.e., the brightness of image. As a general rule, as more fluorescent material 11 is placed on the support 12 or 44, the brighter will be the resultant fluorescent image until the point is reached where all of the incoming electromagnetic energy is absorbed by the fluorescent material. The invention can be practiced in a broad range of information display or entertainment applications. For example, a support 12 or 44 as described above can be used in a commercial location, such as a department store, grocery store, retail shop, etc., to display information regarding pricing information, upcoming sales, current specials, and the like. Unlike prior systems, the present invention would permit quick and easy changes and modifications to the displayed information utilizing the controller (e.g., a personal computer).

One exemplary use of the invention in the entertainment field would be in image displays for entertainment events, such as sporting events (e.g., football, baseball, hockey, basketball, and the like) or social events (nightclubs, bars, displays for shopping malls, and the like). For example, the invention could be used with a sound system at a nightclub to display images related to particular songs being played.

The general concept of the invention will be described further with reference to the following Examples. However, it is to be understood that the following Examples are merely illustrative of the general concepts of the invention and are not intended to be limiting.

EXAMPLE 1

This example demonstrates forming fluorescent images utilizing a laser and a laminated support having fluorescent material located between the plies of the laminate.

A laminated article was formed using a 10 centimeter ("cm") by 10 cm square piece of clear float glass 2 millimeters ("mm") thick as a first ply and a 10 mm by 10 mm by 2 mm thick piece of SOLEX® glass commercially available from PPG Industries, Inc. of Pittsburgh, Pa., as a second ply. SOLEX® glass has a green tint. To incorporate fluorescent material into the laminated article, 0.025 g of Uvitex OB fluorescent material commercially available from Ciba Specialty Chemicals Corporation was dissolved in 50 ml of methanol. This solution was then applied onto a glass blank by dipping a surface of the blank into the solution. The solution remaining on the glass blank was then allowed to dry for five minutes under a heat lamp to form a dried layer of fluorescent material on the blank. A major surface of the 10 cm by 10 cm clear glass ply described above was then pressed against the dried fluorescent material on the glass blank to adhere at least some of the dried fluorescent material onto the major surface of the clear glass ply. The SOLEX® glass ply and the clear glass ply with the adhered fluorescent material were then laminated together utilizing Grade B 180 SL polyvinyl butyral commercially available from E.I. DuPont de Nemours Corporation to form an interlayer having a thickness of 0.5 mm. The clear glass ply was positioned such that the fluorescent material was on the interior surface of the clear glass ply, i.e., on the side of the clear glass ply facing the interlayer. The lamination process included a vacuum stage and an autoclave stage. During the vacuum stage, the assembled parts of the article were subjected to a vacuum from a mechanical pump for seven minutes at room temperature and then for eighteen minutes at 255° F. (124° C.). During the autoclave stage, an automatic process controlled the pressure and temperature. The pressure was raised from atmospheric to 50 psi gage (3.5 kg/sq. cm) in ten minutes, held a 50 psi gauge (3.5 kg/sq. cm) for ten minutes, raised to 200 psi gauge (14 kg/sq. cm) in five minutes, held at 200 pounds per square inch ("PSI") gage reading (14 kg/sq. cm) for thirty minutes, and decreased to atmospheric pressure in five minutes. The temperature was raised to 285° F. (140° C.) in ten minutes, held at 285° F. (140° C.) for thirty-five minutes, and allowed to cool for fifteen minutes. The laminated article was positioned on a support and an energy beam from a laser commercially available from Spectra-Physics and having a rated output of 7.5 mW at 350 nm was directed to the clear glass ply side of the laminated article. The absorption band for the fluorescent material, which has its peak at 375 nm, overlapped the wavelength of the laser output. The electromagnetic radiation from the laser caused the fluorescent material to fluoresce and produce a strong, visible blue dot where the laser beam was directed onto the clear glass ply side of the laminated article. The laser beam, reflected by a hand-held mirror, was moved across the clear glass ply side to cause the fluorescent material in the path of the laser beam to fluoresce. The laser beam was then directed to the SOLEX® glass ply side of the article and no fluorescence was detected. This indicates that the electromagnetic beam from the laser was not transmitted through the SOLEX® glass ply and/or polyvinyl butyral interlayer. Thus, the laser beam passes through the clear glass ply side, but not through the polyvinyl butyral and SOLEX® glass ply side of the article.

EXAMPLE 2

The laminated article from Example 1 above was used with a different projection system than described above.

The projection system used in this Example utilized a model LD1349 laser diode commercially available from Power Technology, Inc. and had a rated output of 5 mW at 395 nm to 397 nm. This wavelength range is also within the absorption band of the Ciba Specialty Chemicals Corporation fluorescent material incorporated into the laminated article. Again, the laser beam was directed to the clear glass ply side of the article and fluorescence was observed yielding a fluorescent blue light along the path of the laser beam.

Figure 5:
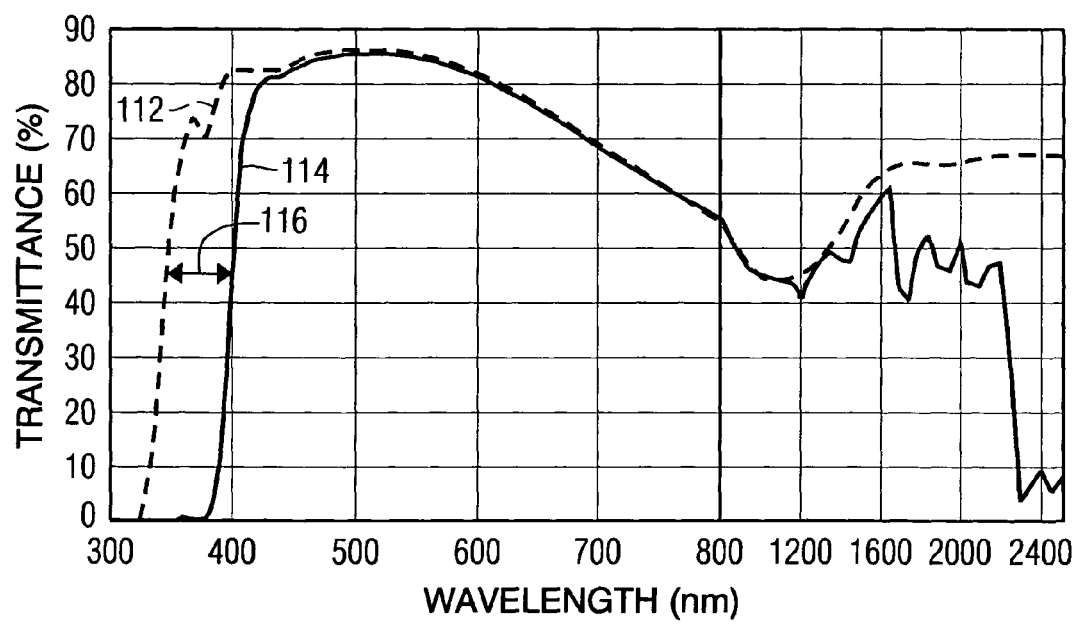
FIG. 5 is a graph of percent transmittance versus wavelength comparing a clear glass ply to a laminated article described in Example 1.

FIG. 5 is a graph of percent transmittance vs. wavelength for a 2.1 mm thick piece of clear float glass (curve 112) and also for the laminated article (curve 114) described above in Example 1. As shown in FIG. 5, for these particular materials there is a "transmittance gap" 116 between the two curves. For example, energy at a wavelength of 370 nm has a transmittance of 70% through the clear glass but has a transmittance of 0% through the laminated article itself. Thus, if a fluorescent material having an absorption band which includes 370 nm is used in the laminated article, an energy beam of 370 nm can be directed through the clear glass side of the laminated article to cause fluorescence but will not pass through the rest of the laminated article.

As was mentioned above, soda-lime-silicate glasses have limitation when used as hosts for Stage II Conversion or Up-Conversion fluorescence. As shown in FIG. 5, there is no transmission gap in the infrared region between the glass and the laminate. This limitation of soda-lime silicate glass can be overcome by positioning a layer of for example dye-doped dendrimer on or between the glass plies or induce very localized phase transition on a micro-crystalline level using rare earth ions as nucleation sites.

While some exemplary embodiments and uses of the present invention have been described above, it will be readily appreciated by those skilled in the art that modifications can be made to the invention without departing from the concepts disclosed in the foregoing description. For example, although the invention was described above with particular use as a head-up display for a vehicle, the display system of the invention could be used in non-vehicular applications, such as the formation of images or information displays on non-transparent surfaces in vehicles or elsewhere, such as walls, ceilings, or opaque screens. This information could include displays of advertisements, entertainment (such as light displays), or decorative patterns which could be changed as desired by an operator. Moreover, although the embodiments described above primarily utilized one or more fluorescent materials, it is to be understood that other types of light emitting materials, such as but not limited to phosphorescent material(s) could be used in lieu of or in addition to the fluorescent material(s).

As can be appreciated, the outer surface of the windshield or insulating unit may be provided with a photocatalytic coating to keep the surface clean such as the type disclosed in U.S. Pat. No. 6,027,766, or a hydrophobic coating, e.g. of the type but not limited to the type sold by PPG Industries Inc. under the trademark AQUAPEL and disclosed in U.S. Pat. No. 5,523,162, which patents are herby incorporated by reference. As can be appreciated by those skilled in the art, photocatalytic coating can include $TiO_2$ films, which absorb UV radiation and therefore the photocatalytic films can act as a functional coating discussed above.

Accordingly, the particular embodiments described in detail herein are illustrative only and are not limiting to the scope of the invention, which is to be given the full breadth of the appended claims and any and all equivalents thereof.

What is claimed is:

1. A laminated article for use in displaying objects, comprising:
   a first transparent sheet having a first major surface and an opposite major surface defined as a second major surface;
   a second sheet having a first major surface and an opposite major surface defined as a second major surface;
   an interlayer between and securing the second surface of the first and second sheets in facing relationship to one another;
   at least one light emitting material capable of Up-Conversion of infrared energy into visible radiation defined as Up-Conversion material on the first major surface of the first sheet or between the first major surfaces of the first and second sheets, and
   a member between the Up-Conversion material and the first major surface of the second sheet, the member passing less than 50% of the infrared energy band impinging on the member.

2. The laminated article according to claim 1 wherein the second sheet is a transparent sheet.

3. The laminated article according to claim 1 wherein the Up-Conversion material is between the first major surface of the first and second sheets.

4. The laminated article according to claim 1, wherein the laminated article is an automotive transparency.

5. The laminated article according to claim 4, wherein the laminated article is a windshield.

6. The laminated article according to claim 1, wherein the Up-Conversion material includes dopants selected from $Tm^{3+}$, $Er^{3+}$, $Tm^{3+}$—$Yb^{3+}$, $Er^{3+}$—$Yb^{3+}$ and mixtures thereof.

7. The laminated article according to claim 1, wherein the Up-Conversion material is selected from fluorescent materials, phosphorescent materials, and mixtures thereof.

8. The laminated article according to claim 1, further including a functional coating located on or within the laminated article.

9. The laminated article according to claim 1, wherein at least one of the first and second sheets is selected from glass, plastic, and ceramic.

10. The laminated article according to claim 9, wherein at least one of the first and second sheets is selected from annealed glass, tempered glass, and heat strengthened glass.

11. The laminated article according to claim 1, wherein the laminated article is selected from the group of a commercial window, a residential window, a commercial sign, an advertising display, and an insulating glass unit.

12. The laminated article according to claim 1 wherein the member passes less than 35% of the infrared energy band impinging on the member.

13. The laminated article according to claim 1 wherein the member passes less than 20% of the infrared energy band impinging on the member.

14. A laminated article for use in displaying images, comprising:
   a first transparent sheet having a first major surface and an opposite major surface defined as a second major surface;
   a second sheet having a first major surface and an opposite major surface defined as a second major surface, wherein at least one of the first and second sheets is selected from annealed glass, tempered glass, and heat strengthened glass;
   an interlayer between and securing the second surface of the first and second sheets to position the first and second sheets in facing relationship to one another;
   at least one light emitting material having an absorption band on the first major surface of the first sheet or between the second major surfaces of the first and second sheets wherein the at least one light emitting material emits wavelengths in the range of 380 to 760 nanometers of the electromagnetic spectrum when radiation of one or more selected wavelengths within the absorption band of the light emitting material impinges on the at least one light emitting material, and
   a member between the at least one light emitting material and the first major surface of the second sheet, the member passing less than 50% of the wavelengths within the predetermined absorption band impinging on the member.

15. The laminated article according to claim 14 wherein the light emitting material is selected from organic light emitting materials, organo-metallic light emitting materials, inorganic light emitting materials and mixtures thereof.

16. The laminated article according to claim 15, wherein the absorption band of the light emitting material is in at least the range of greater than 0 to less than 400 nanometers of the electromagnetic spectrum.

17. The laminated article according to claim 14 wherein the second sheet is a transparent sheet.

18. The laminate article according to claim 14 wherein the light emitting material is selected from fluorescent materials, phosphorescent materials, and mixtures thereof.

19. The laminated article according to claim 14 wherein the light emitting material is a dye-doped dendrimer.

20. The laminated article according to claim 14 wherein the laminated article is an article selected from the group of a commercial window, a residential window, a commercial sign, an advertising display, and an insulating glass unit.

21. The laminated article according to claim 14 wherein the light emitting material emits energy having a wavelength in the range of 400 nanometers to 700 nanometers of the electromagnetic spectrum.

22. The laminated article according to claim 14 wherein the member passes less than 35% of the wavelengths within the predetermined absorption band impinging on the member.

23. A laminated article for use in displaying images, wherein the laminated article is an automotive windshield, comprising:
   a first transparent sheet having a first major surface and an opposite major surface defined as a second major surface;
   a second sheet having a first major surface and an opposite major surface defined as a second major surface;
   an interlayer between and securing the second surface of the first and second sheets to position the first and second sheets in facing relationship to one another;
   at least one light emitting material having an absorption band on the first major surface of the first sheet or between the second major surfaces of the first and second sheets wherein the at least one light emitting material emits wavelengths in the range of 380 to 760 nanometers of the electromagnetic spectrum when radiation of one or more selected wavelengths within the absorption band of the light emitting material impinges on the at least one light emitting material, and
   a member between the at least one light emitting material and the first major surface of the second sheet, the member passing less than 50% of the wavelengths within the predetermined absorption band impinging on the member.

24. The laminated article according to claim 23 wherein the light emitting material is selected from the group of (1) doped oxides, sulfides, or oxide-sulfides of metals selected from the group of $Y_2O_3$:Eu, $YVO_4$:Tm, ZnS:Mn, $Y_2O_2$S:Pr, $Gd_2O_2$S:Tb, and mixtures thereof; (2) phosphors selected from the group of $Lu_2SiO_5$:Ce, $Y_2SiO_5$:Ce, $GdSiO_5$:Ce, $2Gd_2O_3.SiO_2$—Th, $Gd_{2O3}.I_3SiO_2$—Ce, $Gd_2O_3.3SiO_2$—Eu and mixtures thereof; (3) yttrium and gadolinium silicates activated by rare earths elements, and mixtures thereof; (4) luminophors activated by $2Y_2O_3.SiO_2$, $Y_2SiO_5$, $Y_{4.67}(SiO_4)_3O$, or $Y_2Si_2O_7$, prepared from pure Si and $Y_2O_3$ by fusion; and mixtures of (1), (2), (3) and (4).

25. The laminated article according to claim 23 wherein the light emitting material is a fluorescent material and the fluorescent material is between the first sheet and the interlayer.

26. The laminated article according to claim 23 further including a functional coating located on or within the laminated article.

27. The laminated article according to claim 23 wherein the absorption band of the light emitting material is in at least the range of greater than 0 to less than 400 nanometers of the electromagnetic spectrum.

28. The laminated article according to claim 23 wherein the member passes less than 20% of the wavelengths within the predetermined absorption band impinging on the member.

29. The laminated article according to claim 23 wherein the light emitting material is a dye-doped dendrimer.

* * * * *